J. EASTERLY.

Cooking-Stoves.

No. 5,627. Reissued Oct. 28, 1873.

Witnesses
R. T. Campbell
J. H. Campbell

Inventor
James Easterly
by
Mason Fenwick & Lawrence
Attys

AM. PHOTO-LITHOGRAPHIC Co. N.Y. (OSBORNE'S PROCESS)

UNITED STATES PATENT OFFICE.

JAMES EASTERLY, OF DETROIT, MICHIGAN.

IMPROVEMENT IN COOKING-STOVES.

Specification forming part of Letters Patent No. 113,643, dated April 11, 1871; reissue No. 5,627, dated October 28, 1873; application filed July 19, 1873.

*To all whom it may concern:*

Be it known that I, JAMES EASTERLY, of Detroit, in the county of Wayne and State of Michigan, and formerly of Albany, in the county of Albany and State of New York, have invented a Portable Fuel-Feeder for Stoves; and I do hereby declare that the following is a full, clear, and exact description thereof, reference being had to the accompanying drawings, making part of this specification, in which—

Figure 1:
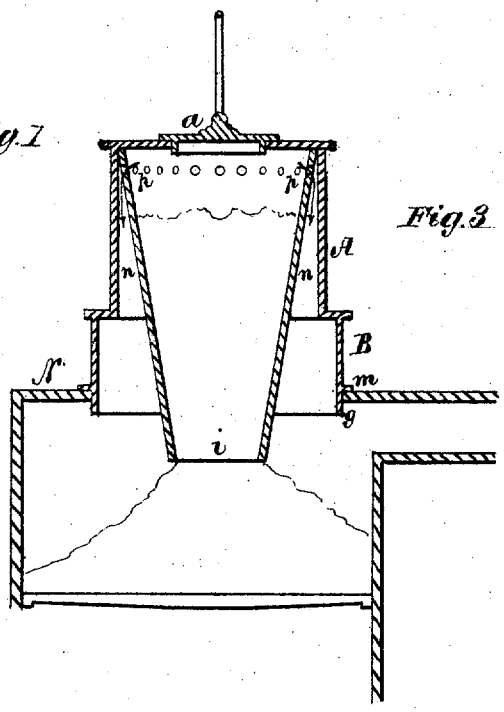
Figure 3:
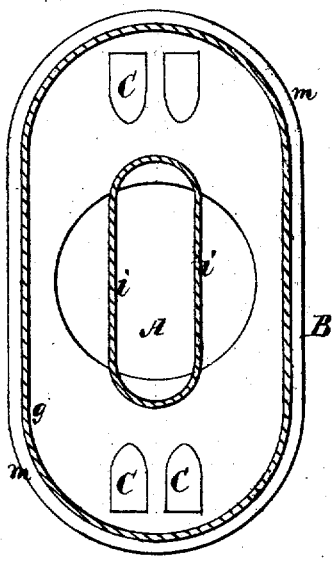
Figure 4:
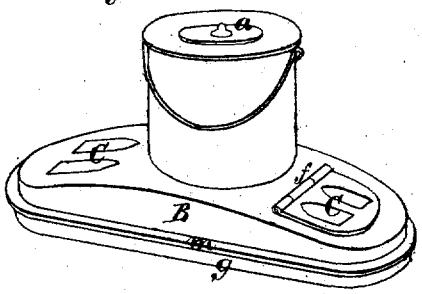
Figure 2:
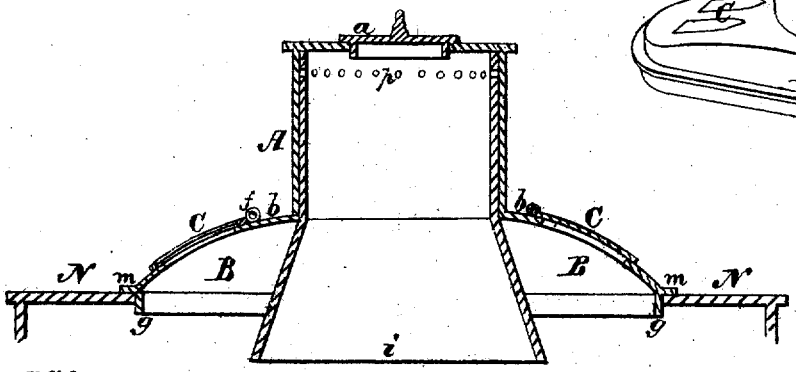

Figures 1 and 2 are sections taken diametrically through the feeder at right angles to each other, showing the feeder upon a cook-stove. Fig. 3 is a horizontal section through the feeder, showing its elongated form. Fig. 4 is a perspective view of the feeder.

Similar letters of reference indicate corresponding parts in the several figures.

The object of this invention is to construct a portable fuel feeder or magazine for stoves or heating apparatus which have not a fuel-feeder permanently applied to them, whereby the feeder can be removed from the stove when it is not required, as will be hereinafter explained.

The following description of my invention will enable others skilled in the art to understand its construction and operation.

In the accompanying drawings, I have represented a feeder the base of which is intended for covering two pot-holes through the top of a stove; but, if desired, this base may be of such size as will cover only one pot-hole.

A represents a reservoir or magazine, which may be made of any desired size. I prefer to have its upper part cylindrical, and to make it of such size that it will contain fuel enough to last from eight to ten hours. The lower part *i* of this reservoir A is flattened and elongated on two sides, as shown in Fig. 3, which flattening and elongation causes its two ends to extend beyond the line of the circle forming the diameter of the upper part of this reservoir. I thus make the lower end of the reservoir conform to an oblong fire-box, such as are generally used in cooking-stoves, and am thereby enabled to distribute the fuel properly over the grate. B represents the enlarged base or jacket of the reservoir A, which supports it upon the top plate N of a stove. This base has an oval ring, *g*, about three-quarters of an inch deep and seven inches wide for a seven-inch stove, and its length is equal to the usual length of the front hole of the stove when the plates and center bridge are removed. Around the ring is a flange, *m*, extending about one inch beyond rim *g* all around it. From the inner edge of the flange *m* the top *b* of the base B rises in an arched form, as shown in Fig. 2. On the top *b* of base B I apply doors or windows C, one of which is hinged, as shown at *f*, and to these doors or windows mica is applied for the purpose of exposing through them the light of the fire below. Reservoir A is secured to the base B in such a position that its lower laterally-flaring and elongated end *i* is a little below the rim *g*, for the purpose of preventing the descending fuel from choking or closing up the direct draft of the stove to which the reservoir may be applied. The base B also affords a sufficiently large combustion-chamber for the extra use to which the stove is subjected—that is to say, there is a large space formed by this base around the lower part of the reservoir A for free combustion. The reservoir is provided with a bail, D, for convenience in handling it. It also has an opening through its top for the supply of fuel, which opening is closed by a cover, *a*, as shown in Figs. 1, 2, and 4. There are spaces *n n* between the outer and inner walls of the reservoir, which communicate with the interior of the reservoir by means of apertures *p p*, and conduct the gas which rises above the fuel in the reservoir down into the fire-box of the stove, where such gas is consumed. This will prevent the said gas from escaping from the joints around the cover *a*.

To use the feeder, the two front covers and center bridge of a stove are removed, and, by means of the bail D, the feeder is lifted, and the rim *g* of its base adjusted into the hole through the top plate of the same and over the fire-box. The reservoir is then filled with fuel, and the cover *a* put in place. Then, by means of registers in the front doors or the hearth of the stove, or by other suitable means provided for the purpose, the draft to the fire may be so regulated as to make it burn all night. In the morning the portable attachment may be removed, and the top of the stove made to serve its usual purposes.

It is evident that the feeder A can be constructed to set in one boiler-hole only. The reservoir can be constructed to rest directly upon the top of the stove without departing from the plan of my invention, it only being necessary to dispense with the base B, and rest the part A down upon the stove. Of course the parts will, under such a use, be relatively proportioned, so as to serve the purposes of a self-feeder for a stove.

It will thus be seen that by means of my portable fuel-feeder an ordinary stove may be converted, at pleasure, into a self-feeding stove, and that with a very small quantity of fuel a fire can be kept up for a long time; and while this is the case, the feeder can be removed from the stove and set one side, out of the way, when it is not required.

Having described my invention, what I claim as new, and desire to secure by Letters Patent, is—

1. A portable magazine-feeder for a stove, provided with a supporting-base, B, which is in form similar to a segment of a hollow cylinder or a segment of a hollow elliptical figure, and adapted for covering a plurality of boiler-holes, the said base being attached to and removable with the magazine-feeder, substantially as described.

2. The reservoir A of the portable feeder, constructed with a lower laterally-extended end, *i*, for evenly distributing the fuel in an oblong fire-box, substantially as described.

3. The combination of the windows *e* with a portable magazine, A, substantially as described.

4. In a portable magazine-feeder, the combination of a magazine which is circular in horizontal section along a portion of its length, and elliptical in horizontal section along another portion of its length, with a crown-shaped base which is attached to the magazine and portable with it, substantially as and for the purpose described.

5. A portable base-burning fuel-supplying apparatus, with a jacket around its magazine, holes *n n*, and apertures *p p*, substantially as shown and described.

JAMES EASTERLY.

Witnesses:
JAS. W. BENTLEY,
HENRY Z. POTTER.